(12) United States Patent  
Dinh et al.

(10) Patent No.: US 6,610,927 B2
(45) Date of Patent: Aug. 26, 2003

(54) WATER RESISTANT ELECTRICAL BOX

(75) Inventors: Cong Thanh Dinh, Memphis, TN (US); Mark R. Drane, Germantown, TN (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 10/097,213

(22) Filed: Mar. 13, 2002

(65) Prior Publication Data

US 2002/0134568 A1 Sep. 26, 2002

Related U.S. Application Data

(60) Provisional application No. 60/276,071, filed on Mar. 15, 2001.

(51) Int. Cl.$^7$ ................................................. H02G 3/14
(52) U.S. Cl. ........................... 174/66; 174/67; 220/241; 220/242; 439/136; D8/353; D13/177
(58) Field of Search ............................... 174/66, 67, 58, 174/48, 50, 53; 220/241, 242, 3.8, 4.02; 292/336; D8/353; 312/328, 229; 439/136; D13/177

(56) References Cited

U.S. PATENT DOCUMENTS

| | | | |
|---|---|---|---|
| 4,265,365 A | 5/1981 | Boteler | |
| 4,355,197 A | 10/1982 | Jonsson | |
| 4,381,063 A | 4/1983 | Leong | |
| 4,654,470 A | * 3/1987 | Feldman et al. | 174/50 |
| 5,070,720 A | 12/1991 | Burns | |
| 5,239,129 A | 8/1993 | Ehrenfels | |
| 5,310,075 A | 5/1994 | Wyler | |
| 5,486,650 A | * 1/1996 | Yetter | 174/53 |
| 5,569,882 A | 10/1996 | Yokoyama et al. | |
| 5,594,207 A | * 1/1997 | Fabian et al. | 174/58 |
| 5,621,192 A | 4/1997 | Bordwell et al. | |
| 5,834,694 A | 11/1998 | Bakker et al. | |
| 5,837,936 A | * 11/1998 | Rogers et al. | 174/65 R |
| 5,992,152 A | 11/1999 | Weres et al. | |
| 6,200,155 B1 | 3/2001 | Chudkosky et al. | |
| 6,265,662 B1 | * 7/2001 | Riedy et al. | 174/66 X |
| 6,281,440 B1 | * 8/2001 | Baldwin et al. | 174/66 |

* cited by examiner

Primary Examiner—Dhiru R Patel
(74) Attorney, Agent, or Firm—Hoffmann & Baron, LLP

(57) ABSTRACT

A water resistant electrical floor box includes a base, side walls, an open face defining an interior portion. The interior portion is divided into a receptacle interior and a drainage interior portion with a dividing wall. Substantially covering the open face is a cover assembly. The cover assembly includes a flange, and a cover pivotally attached thereto. The cover includes a pivotal door thereon to allow wires to exit. In addition, the box further includes a cover assembly with a channel to direct the water away from the receptacle interior portion.

23 Claims, 5 Drawing Sheets

WATER RESISTANT ELECTRICAL BOX

CROSS-REFERENCE TO RELATED APPLICATION

This application claims the benefit of U.S. Provisional Application No. 60/276,071 filed Mar. 15, 2001, entitled "Water Resistant Electrical Box".

FIELD OF THE INVENTION

The present invention relates generally to a box for housing electrical termination devices such as jacks and receptacles. More particularly, the present invention relates to a water resistant concealed surface floor box for accommodating termination devices as well as electrical cables which are to be connected thereto.

BACKGROUND OF THE INVENTION

Electrical boxes and housings are typically used to house electrical termination devices such as electrical receptacles and data/communication jacks which terminate wires running thereinto. These termination devices are provided so as to permit connection of electrical wires and cables terminated by complimentary termination devices such as plugs and the like.

With many electrical boxes, especially those which are used to house termination devices positioned within a floor, it is desirable to construct the box to be water resistant, so as to protect the components housed therein. Undesirable accumulation of water within the box can be detrimental to such components. Various electrical codes and standards such as those promulgated by Underwriters Laboratories (UL) require the floor boxes to have a certain degree of water resistance, i.e., resistance to entry of water over a period of time.

The art has seen a wide variety of box constructions which are designed to prevent the accumulation of water within the box. Many of these designs employ complicated gaskets which are interposed between the box and the cover of the box so as to prevent water from entering therebetween. While these gaskets do adequately prevent water entry, the gasket structures rely on precise assembly of the components, including the gaskets. Furthermore, as the cover must be at least partially open to render accessible the termination devices housed within the box for permitting termination, water has a tendency to enter the box through the opening.

It has been especially noted that, even where gaskets may tightly seal the interface between the cover and the box itself, during use, water still has a tendency to track or migrate into the box along the wires and cables which enter the box.

It is, therefore, desirable to provide a gasketless, covered floor box which prevents water from entering between the cover and the box, and which also prevents the tracking of water to the terminations along the inserted cables.

SUMMARY OF THE INVENTION

The present invention is directed to a gasket less water-resistant electrical floor box to prevent water from entering the box and also prevent the tracking of water to the terminations along the inserted cables or wires. The present invention includes a box which has an interior defined by a base, side walls and an open, upper face defined by the side walls. The box has a dividing wall supported within which divides the interior into receptacle interior portion, and drainage interior portion. The open, upper face of the box has a cover assembly attached. The cover assembly includes a flange supported on and extending around the side walls at the open, upper face of the box, and a cover pivotably attached to said flange which has a sufficient expanse to substantially cover the open, upper face. The cover further includes a pivotably openable door thereon to allow electrical wires therethrough.

In another form of the invention, a box includes a base, side walls, open upper face, dividing walls which divide the interior into a receptacle interior portion and a drainage interior portion. The box further has a cover assembly which includes a flange supported on and extending around the side walls at the open upper face of the box, and a cover pivotably attached to the flange and having sufficient expanse to substantially cover the open upper face. The cover includes a pivotably openable door thereon and projection portion into the interior portion of the box to engage an electrical wire therein, the door being located in registry with the drainage interior portion of the box to allow electrical wires to exit the box.

In a further form of the invention, the box includes a cover assembly having a channel. The channel has extending ribs from the flange, and perimetrical grooves in the cover to accommodate the ribs, wherein the channel directs the liquid away from the receptacle interior portion and towards the drainage interior portion.

DETAILED DESCRIPTION OF THE PREFERRED EMBODIMENT

The present invention is directed to a water resistant electrical box for use in floor applications which provides water protection to the components accommodated therein without use of a gasket.

Figure 1:
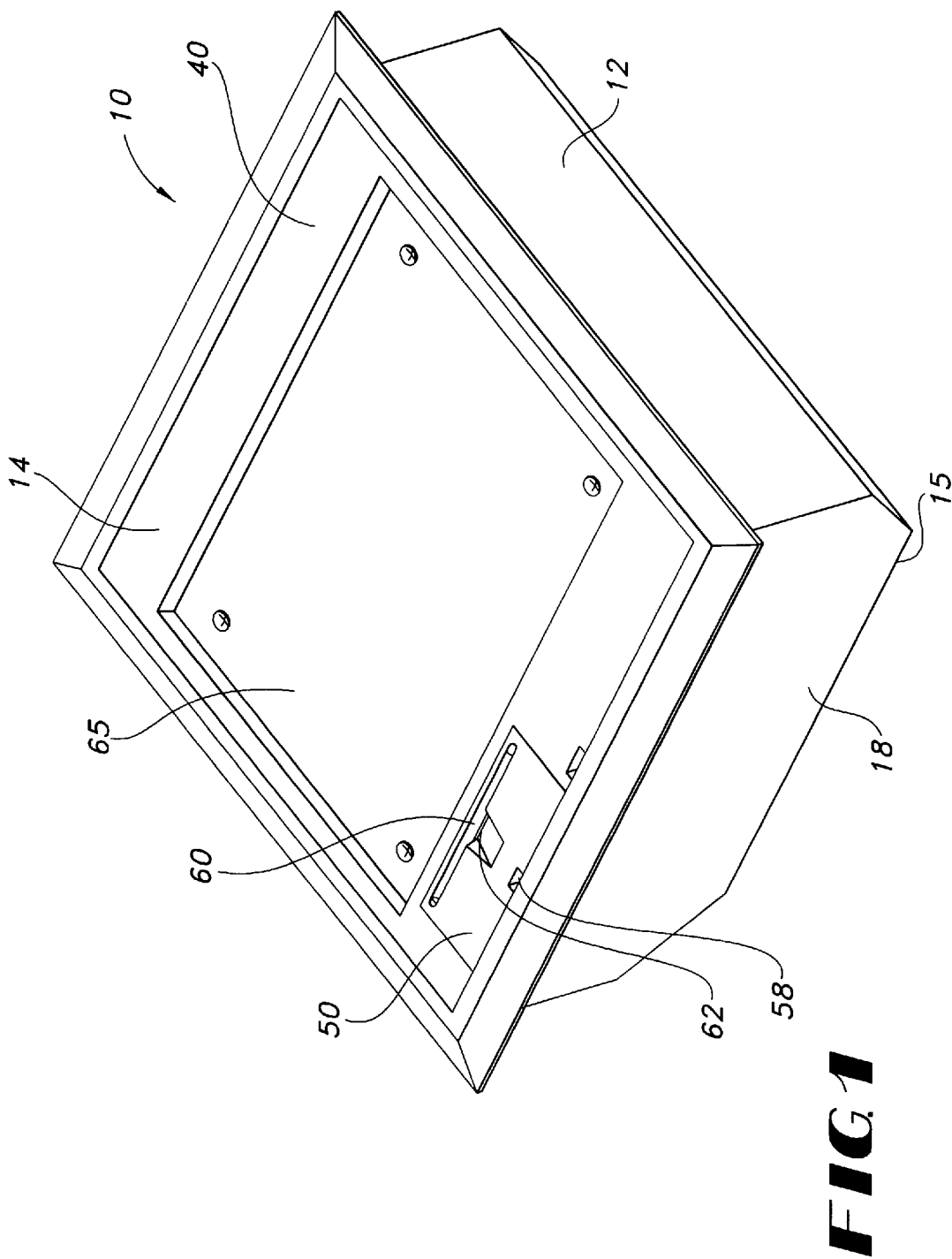
FIG. 1 is a perspective showing of the water resistant electrical floor box of the present invention.
Figure 2:
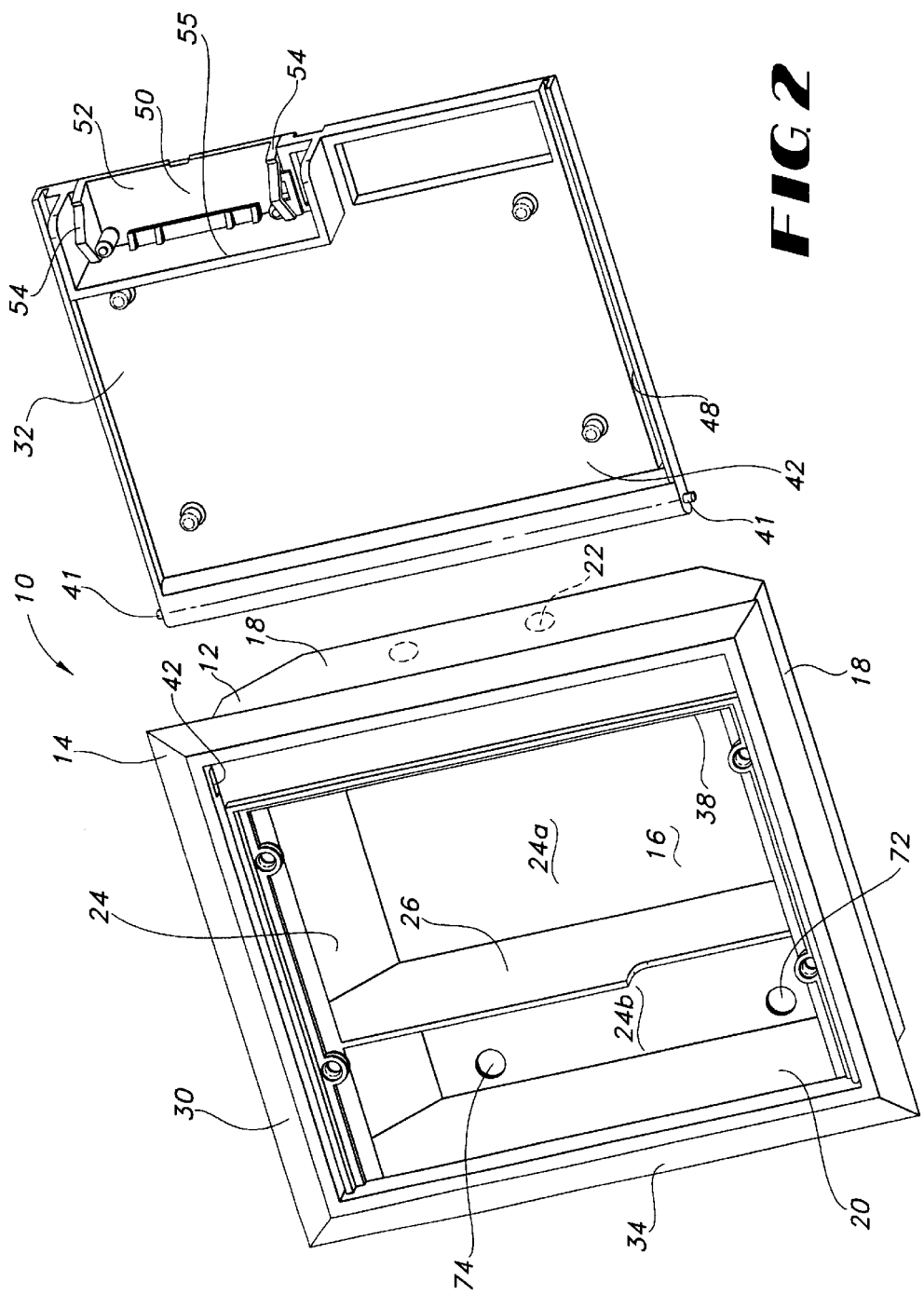
FIG. 2 is a top perspective showing of the water resistant box of FIG. 1, having a cover shown detached from the base.
Figure 3:
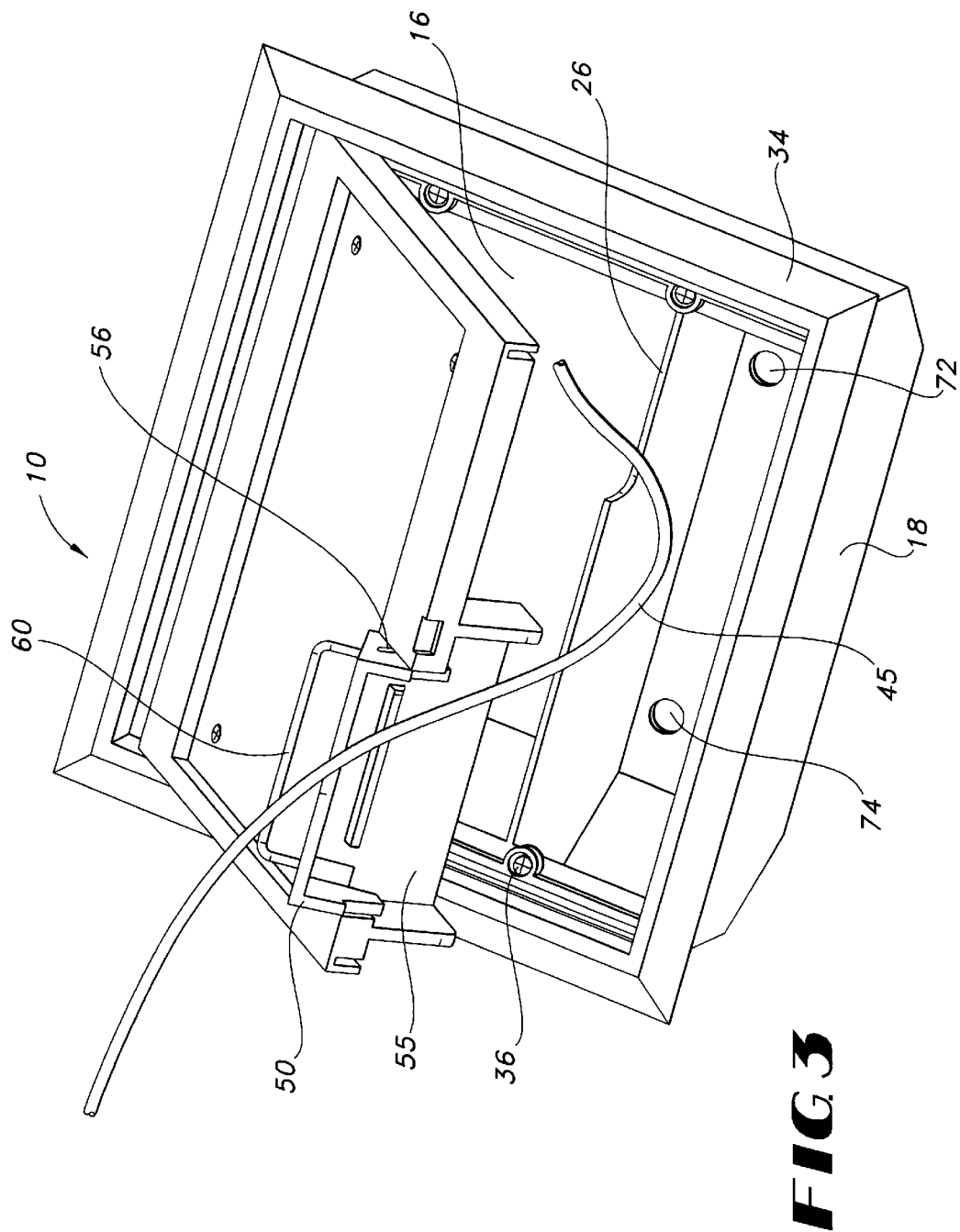
FIG. 3 is a top perspective showing of the water resistant floor box of FIG. 1, with a cover attached and partially open and a wire inserted therein.

Referring now to FIGS. 1–3, the water resistant floor box 10 of the present invention is shown. Floor box 10 includes a box housing 12 and a cover assembly 14. Housing 12 is a generally rectangular box-like member having a bottom wall 15, four side walls 18, bounding bottom wall 16, and an upper open end 20 over which is positioned cover assembly 14. As is well known, box housing 12 may be formed of a variety of materials. In the particular application shown here, box housing 12 is formed of metal.

As is particularly shown in FIG. 2, one side wall 18 may include one or more conventional knockouts 22 to permit entry of wires and cables (not shown) into the interior of box housing 12 for termination purposes. In that regard, box housing 12 has divided interior 24, including a larger first interior portion 24a and a smaller second interior portion 24b divided by a central dividing wall 26 which extends from the bottom wall 16 to the upper open end 20.

Figure 5:
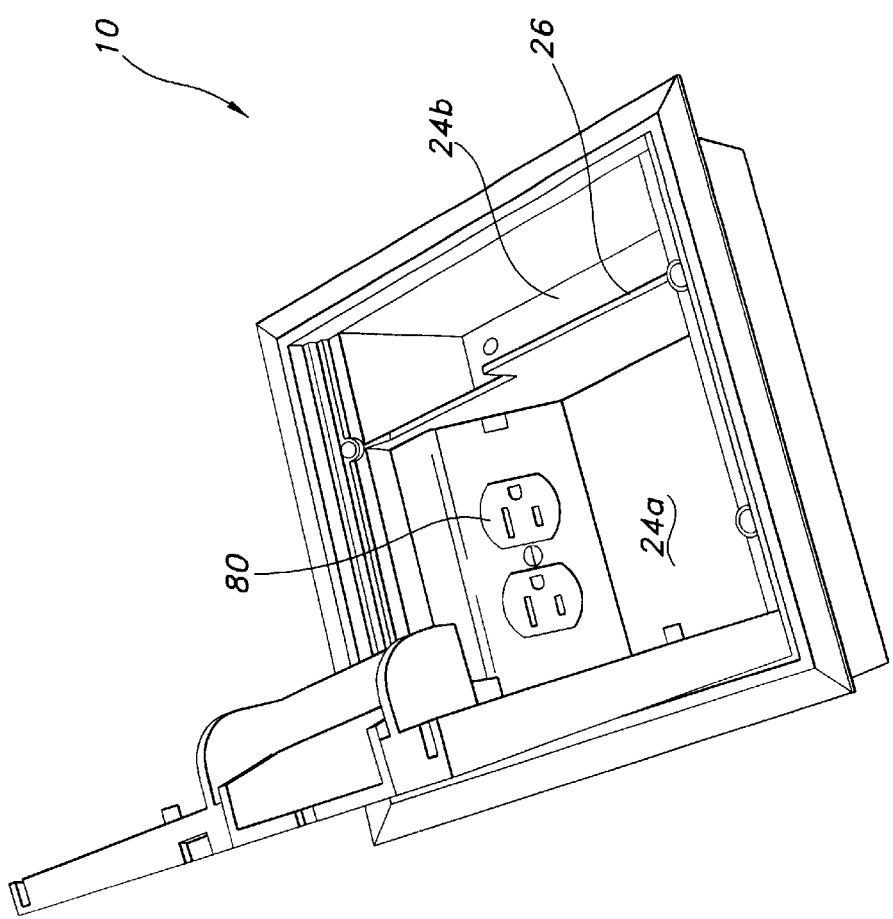
FIG. 5 is a top perspective view of the water resistant floor box of the present invention, showing internal compartments thereof.

As shown in FIG. 5, interior compartment 24a accommodates various electrical termination devices such as electrical receptacles 80 and data and communication jacks which may be mounted therein in conventional fashion. Wires and cables which are inserted through knockouts 22 are terminated with mating plugs which permit the wires and cables to be connected to the termination devices with interior compartment 24a of box housing 12. As will be described in further detail hereinbelow, smaller interior compartment 24b is designed to accommodate portions of the terminated wires and cables that are inserted into the box through the open end thereof.

Housing 12 of floor box 10 is designed for insertion within a floor so that the open upper end 20 lies approximately at floor level. The open upper end 20 of housing 12 is covered by cover assembly 14. As shown in FIG. 2, cover assembly 14 is generally a two component member, having a rim-like base 30 and a pivotally mounted cover 32. Cover assembly 14 is typically formed of molded plastic. Rim-like base 30 is generally a rectangular member, having side walls 34 which taper downwardly and outwardly so as to extend beyond the perimeter of open upper end 20 of box housing 12. The side walls 34 together form a carpet flange so as to make a smooth transition from the cover assembly 14 to the carpet or other floor covering which overlies the floor into which electrical floor box 10 is inserted. Rim-like base 30 may be attached to the side walls 18 of housing 12 by conventional fasteners such as screws 36 which are shown in FIG. 3.

Rim-like base 30 further includes upwardly extending ribs 38 which extend around three sides of the rim-like base 30. As will be described in further detail, the ribs are designed for fitting into mating grooves of pivotal cover 32 to help channel water which may come in contact with electrical floor box 10.

Figure 4:
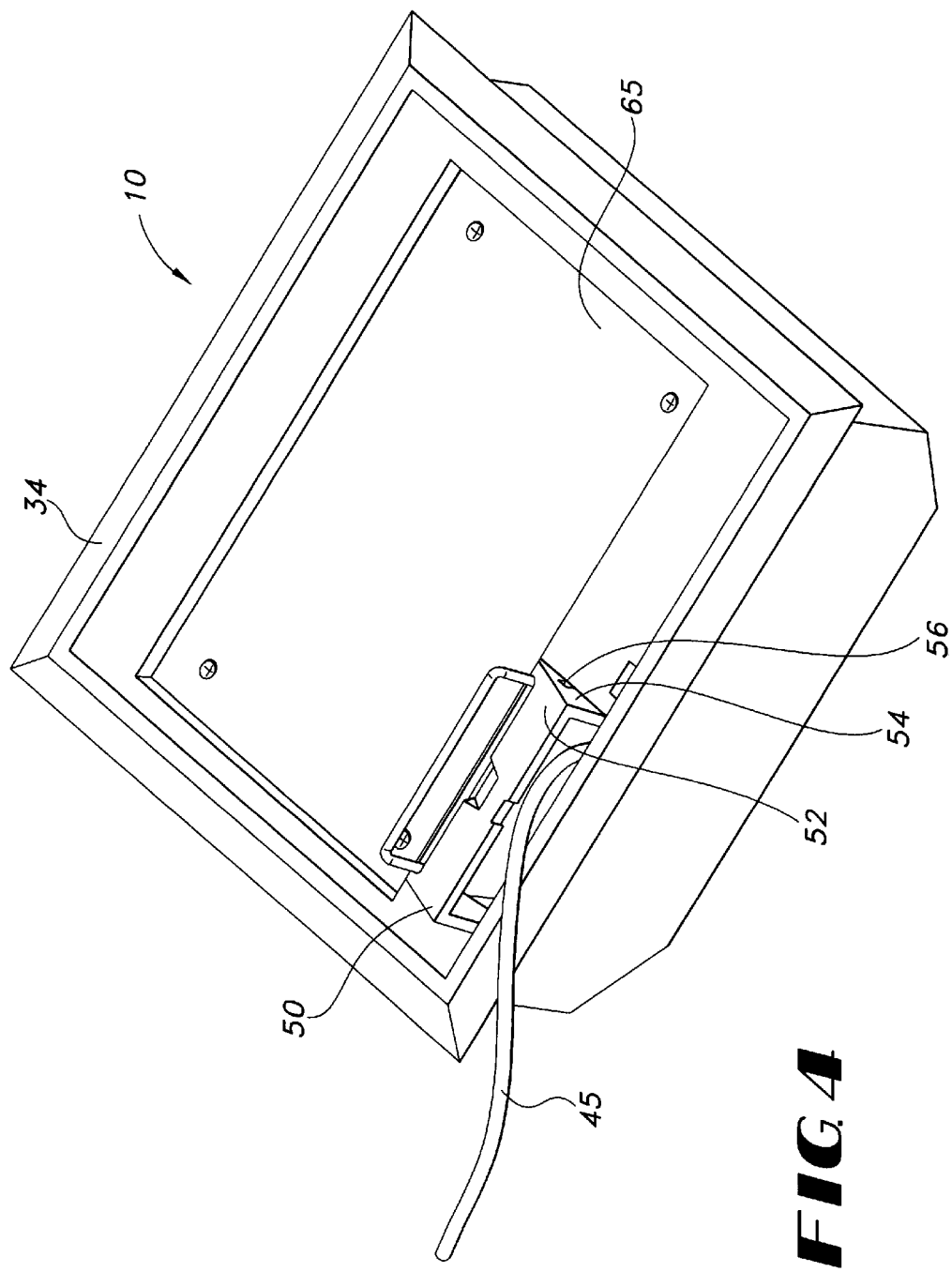
FIG. 4 shows the water resistant floor box of FIG. 3, with the cover closed around the wire.

Pivotal cover 32 is generally a planar member, having an upper surface 40 shown in FIG. 1 and an under surface 42 shown in FIG. 2. Cover 32 is mounted to rim-like base 30 for pivotal movement therewith by a cooperating pin and socket hinge structure. Cover 32 includes, at one end thereof, a pair of outwardly directed pins 41 while rim-like base 30 includes an associated pair of sockets 42 for accommodating pins 41. Pins 41 of cover 32 reside within the sockets 42 of base 30 so as to provide pivotal movement between cover 32 and base 30 so that cover 32 may be moved between an open position shown in FIG. 3 and a closed position shown in FIG. 4.

The cover 32 is pivotally attached to base 30 adjacent the larger interior portion 24a of housing 12. Thus, the cover is pivotal toward the smaller interior portion 24b. Furthermore, the under surface 42 of cover 32 includes partial perimetrical grooves 48 about cover 32. Grooves 48 accommodate the upwardly extending ribs of base 38. The rib and groove structure helps to channel water which may fall on the closed cover 32, preventing water from being directed into larger interior portion 24a which accommodates the receptacles. As will be described in further detail hereinbelow, the water is channeled into smaller interior portion 24b.

Cover 32 further includes a pivotally openable door 50 thereon. Door 50 is positioned at a corner of the cover, away from the pivot connection of the cover 32 to the base 30 so that the door 50 overlies smaller interior portion 24b of interior 24. Door 50 includes a top wall 52, and a pair of depending side walls 54 partially bounding top wall 52. The door 50 is pivotally attached to cover 32 by a cooperating track-like structure. Opposed side walls 54 may include a groove-like track 56 which mates with projections on the cover to permit the door to be opened and closed in a generally pivotal fashion. The door 50 permits entry of terminated wire 45 into the interior 24 of housing 12. The cover further includes a projecting portion 55.

In the closed position, the projecting portion 55 of cover 32 extends into the smaller interior portion 24b and, as will be described in further detail hereinbelow, forces cable 45 inserted through the open door 50 downward into interior portion 24b.

Door 50 also includes a handle 60 seated into a channel 62 of top wall 52. Handle 60 is retractable within channel 62 and may be used to manually lift or open the door.

Having described the components of the water resistant electrical box of the present invention, its operation may now be described. The box 10, as described in FIG. 1, may be inserted into a floor through which wires and cables (not shown) are typically run. The housing 12 may be inserted into the floor with or without the cover assembly 14 attached thereto. If the housing 12 is inserted first, the cover assembly 14 may be positioned subsequently. The wires and cables are run through knockouts 22 to electrical receptacles 80 and jacks (FIG. 5) supported within the housing 12. Once the cover assembly 14 is attached, the tapered rim-like base provides a smooth transition to a carpet or other flooring placed over the floor.

In order to maintain a smooth transition with the floor, the upper surface 40 of cover 32 may include a centrally located area of relief 65. In this area, a segment of carpeting or flooring which matches the remainder of the floor may be inserted in order to make the electrical box more aesthetically pleasing. In addition, as the floor box 10 is designed to be used directly on a floor, and may be in a high traffic area, the area of relief may also provide for the accommodation of a metallic plate thereon which will stiffen the cover 32 to accommodate pedestrian traffic. The decorative carpeting or flooring may be placed directly over the metallic plate.

Referring now to FIG. 3, in order to connect a terminated electrical wire 45 to the receptacles and jacks supported within floor box 10, the cover 32 is pivotally moved to an open position. Connections can now be made in the conventional fashion to the receptacles and jacks which are supported in larger first interior portion 24a. After the connections are made, the cover can be pivotally closed to lie flush with the floor. In order to accommodate the egress of the terminated wires 45, the door 50 is open. By opening door 50, the terminated wires 45 can exit through cover 32. Once the wires 45 is run exteriorly of the floor box, the door 50 may be fully or partially closed to a position shown in either FIG. 1 or 4. The top wall 52 of door 50 may include a cut-out portion 58 which allows the door to be fully closed even where the wires 45 is egressing box 10. In that regard, the cut-out portion 58 is formed to a size which is approximately equal to that of a conventional wire 45 which may be run into floor box 10.

With cover 32 closed, any water which may fall on box 10 is channeled by the rib and groove structure perimetrically formed about base 30. The water is channeled along the rib and groove structure from the rear portion of the box adjacent to the pivot connection to the forward portion of box adjacent door 50. The channeled water then enters box 10 at smaller interior portion 24b which houses no electrical termination. Water may flow into interior portion 24b and may be drained through drain openings 72 and 74 in the bottom surface thereof without contacting the receptacle and jacks housed in larger interior portion 24a.

The present invention further prevents water which may track along the connected wire 45 from entering the larger interior portion 24a which houses the receptacles and jacks. Once the wire 45 is connected to the receptacle, the wire exits the box through door 50. As it does, so it passes over divider 24 and smaller interior portion 24b. When the door 50 is closed or partially closed over the exiting wire 45, a portion of the wire directly overlies smaller interior portion 24b. The projection portion 55 forces the wire down into smaller interior portion 24b placing a bow or dip in the wire beneath the upper extent of partition 24. Thus, as water tracks along wire 45 from the exterior of box 10 to the interior, water will, under the influence of the surface tension and gravity flow along the wire down into smaller interior portion 24b below the upper extent of partition 24. Any water so tracking will now drip off of wire 24 and will not continue tracking upwardly and over partition 24. Any water which drips off of wire 45 in smaller interior portion 24b is drained outwardly through drain opening 72 and 74. Water is prevented from tracking into the larger interior portion 24a which houses receptacles and jacks. Thus, the interior portion 24a remains dry protecting the electrical terminations and connections therein.

It will be appreciated that the present invention has been described herein with reference to certain preferred or exemplary embodiments. The preferred or exemplary embodiments described herein may be modified, changed, added to or deviated from without departing from the intent, spirit and scope of the present invention. It is intended that all such additions, modifications, amendments and/or deviations be included within the scope of the claims appended hereto.

What is claimed is:

1. A water resistant electrical floor box comprising:
   (a) a box having an interior defined by a base, and side walls and an open upper face defined by the side walls, said box having a dividing wall supported therein, wherein said dividing wall divides said interior into a receptacle interior portion and a drainage interior portion; and
   (b) a cover assembly comprising:
      (i) a flange supported on and extending around the side walls at the open upper face of said box; and
      (ii) a cover pivotally attached to said flange and having sufficient expanse to substantially cover said open upper face, the cover comprising a projecting portion into said interior portion of said box to engage an electrical wire therein, and a pivotally openable door thereon, said door being located in registry with the drainage interior portion of the box to allow electrical wires to exit said box.

2. The box according to claim 1, wherein said dividing wall has an opening to allow electrical wires therethrough.

3. The box according to claim 2, wherein said box comprises a knockout in at least one of said side walls to allow an electrical wire therethrough.

4. The box according to claim 3, wherein said box has a hole in said base.

5. The box according to claim 3, wherein said box has a hole in said drainage interior portion thereof.

6. The box according to claim 5, wherein said door comprising a top wall, two depending side walls connected to said top wall, a cooperating track-like structure having a groove-like track in said depending side walls, and projections on the cover which mate to said grooves to permit the door to open and close in pivotal fashion.

7. The box according to claim 1, wherein said projecting portion comprises a back wall and two side walls attached to said back wall, defining an inner projecting area wherein said pivotal door is adjacent to and opens to said projecting area.

8. The box according to claim 1, wherein said cover comprises a pivotal connection being located in registry with said side walls of said box of said receptacle interior portion, wherein said cover pivotally opens away from said drainage interior portion.

9. The box according to claim 8, wherein said door is positioned at a corner of said cover, and spaced from said pivot connection of said cover.

10. The box according to claim 9, wherein said dividing wall has an opening adjacent said open, upper face of said cover and remote from said door.

11. A water resistant electrical floor box comprising:
   (a) a box having an interior defined by a base, and side walls and an open upper face defined by the side walls, said box having a dividing wall supported therein, wherein said dividing wall divides said interior into a receptacle interior portion and a drainage interior portion; and
   (b) a cover assembly comprising:
      (i) a flange supported on and extending around the side walls at the open upper face of said box;
      (ii) a cover pivotally attached to said flange and having sufficient expanse to substantially cover said open upper face, the cover comprising a projecting portion into said interior portion of said box to engage an electrical wire therein, and a pivotally openable door thereon, said door being located in registry with the drainage interior portion of the box to allow electrical wires to exit said box; and
      (iii) a channel comprising extending ribs from said flange, and perimetrical grooves in said cover to accommodate said ribs, wherein said channel directs liquid away from said receptacle interior portion.

12. The box according to claim 11, wherein said channel is a continuous channel which extends partially around the cover assembly.

13. The box according to claim 12, wherein said dividing wall has an opening to allow electrical wires therethrough.

14. The box according to claim 13, wherein said box comprises a knockout in at least one of said side walls to allow an electrical wire therethrough.

15. The box according to claim 14, wherein said box has a hole in said base.

16. The box according to claim 14, wherein said box has a hole in said drainage interior portion thereof.

17. The box according to claim 16, wherein said door comprises a top wall, two depending side walls connected to said top wall, a cooperating track-like structure having a groove-like track in said depending side walls, and projections on the cover which mate to said grooves to permit the door to open and close in pivotal fashion.

18. The box according to claim 11, wherein said projecting portion comprises a back wall and two side walls attached to said back wall, defining an inner projecting area wherein said pivotal door is adjacent to and opens to said projecting area.

19. The box according to claim 11, wherein said cover comprises a pivotal connection being located in registry with said side walls of said box of said receptacle interior portion, wherein said cover pivotally opens away from said drainage interior portion.

20. The box according to claim 19, wherein door is positioned at a corner of said cover, and spaced from said pivot connection of said cover.

21. The box according to claim 20, wherein said dividing wall has an opening adjacent said open, upper face of said cover and remote from said door.

22. A water resistant electrical floor box comprising:
   (a) a box having an interior defined by a base, and side walls and an open upper face defined by the side walls, said box comprises a knockout in at least one of said side walls to allow an electrical wire therethrough, said box including a dividing wall supported therein, wherein said dividing wall divides said interior into a receptacle interior portion and a drainage interior portion, said box has a hole in said drainage interior portion thereof, said dividing wall having an opening to allow electrical wires therethrough; and
   (b) a cover assembly comprising:
      (i) a flange supported on and extending around the side walls at the open upper face of said box; and
      (ii) a cover pivotally attached to said flange and having sufficient expanse to substantially cover said open upper face, the cover comprising a pivotally openable door thereon to allow said electrical wires therethrough and into at least said receptacle interior portion, wherein said door comprises a top wall, two depending side walls connected to said top wall, a cooperating track-like structure having a groove-like track in said depending side walls, and projections on the cover which mate to said groove-like track to permit the door to open and close in pivotal fashion.

23. A water resistant electrical floor box comprising:
   (a) a box having an interior defined by a base, and side walls and an open upper face defined by the side walls, said base having a hole therein, said box comprises a knockout in at least one of said side walls to allow an electrical wire therethrough, said box Including a dividing wall supported therein, wherein said dividing wall divides maid interior into a receptacle interior portion and a drainage interior portion, said dividing wall has an opening to allow electrical wires therethrough;
   (b) a cover assembly comprising:
      (i) a flange supported on an extending around the Side walls at the open upper face of said box; and
      (ii) a cover pivotally attached to said flange and having sufficient expanse to substantially cover said open upper face, the cover comprising a pivotally openable door thereon to allow said electrical wires therethrough and into at least said receptacle interior portion; and
   (c) a movable top wall comprises a handle seated into a channel of the top wall, wherein said handle is retractable within said channel to lift and open the door.

* * * * *